(12) United States Patent
Fukuda et al.

(10) Patent No.: US 9,807,216 B2
(45) Date of Patent: Oct. 31, 2017

(54) PHONE DEVICE

(71) Applicant: Panasonic Intellectual Property Management Co., Ltd., Osaka (JP)

(72) Inventors: Hikaru Fukuda, Fukuoka (JP); Masaru Baba, Fukuoka (JP); Hideo Fujii, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/269,454

(22) Filed: Sep. 19, 2016

(65) Prior Publication Data

US 2017/0094041 A1 Mar. 30, 2017

(30) Foreign Application Priority Data

Sep. 30, 2015 (JP) ................. 2015-193874

(51) Int. Cl.
| | |
|---|---|
| *H04B 1/00* | (2006.01) |
| *H04M 1/60* | (2006.01) |
| *H04M 3/42* | (2006.01) |
| *H04M 1/57* | (2006.01) |

(52) U.S. Cl.
CPC ......... *H04M 1/6041* (2013.01); *H04M 1/578* (2013.01); *H04M 3/42093* (2013.01); *H04M 2250/58* (2013.01)

(58) Field of Classification Search
None
See application file for complete search history.

(56) References Cited

U.S. PATENT DOCUMENTS

| | | | |
|---|---|---|---|
| 7,406,408 B1* | 7/2008 | Lackey ................. | G10L 15/005 704/10 |
| 2003/0215074 A1* | 11/2003 | Wrobel ................... | H04M 1/57 379/142.04 |
| 2005/0020288 A1* | 1/2005 | Davis ................ | H04M 3/53308 455/466 |
| 2005/0149327 A1* | 7/2005 | Roth ....................... | G10L 15/10 704/251 |
| 2008/0300012 A1* | 12/2008 | An ...................... | H04N 21/4223 455/556.1 |
| 2013/0124186 A1* | 5/2013 | Donabedian .......... | G06F 17/289 704/2 |
| 2014/0098247 A1* | 4/2014 | Rao ......................... | H04W 4/20 348/207.1 |
| 2015/0022616 A1* | 1/2015 | Talbot .................... | H04N 7/147 348/14.01 |

FOREIGN PATENT DOCUMENTS

JP 2002-218044 A 8/2002

* cited by examiner

*Primary Examiner* — Mohammed Rachedine
(74) *Attorney, Agent, or Firm* — Seed IP Law Group LLP

(57) ABSTRACT

A cordless phone base unit includes a storage unit that stores a phone number of other party in association with a name of the other party in a registration table, a reading unit that reads the name of the other party from the storage unit based on a received phone number of the other party, a language selection unit that selects a language corresponding to the read name of the other party, and a voice data generating unit that converts the read name of the other party into voice data in the selected language and outputs the voice data.

14 Claims, 12 Drawing Sheets

FIG. 3A

| | | |
|---|---|---|
| REGISTRATION 1 | PHONE NUMBER | 124-222-1234 |
| | NAME OF OTHER PARTY | Adrián Gutiérrez |
| | MANAGEMENT INFORMATION | 02 |
| REGISTRATION 2 | PHONE NUMBER | 521-987-5555 |
| | NAME OF OTHER PARTY | John Smith |
| | MANAGEMENT INFORMATION | 01 |
| REGISTRATION 3 | PHONE NUMBER | 184-555-4875 |
| | NAME OF OTHER PARTY | Jesús Arias |
| | MANAGEMENT INFORMATION | 02 |
| ·· | ·· | |
| REGISTRATION 100 | PHONE NUMBER | 234-456-6789 |
| | NAME OF OTHER PARTY | Mike Brown |
| | MANAGEMENT INFORMATION | 01 |

FIG. 3B

| MANAGEMENT INFORMATION | LANGUAGE |
|---|---|
| 00 | INVALID |
| 01 | AMERICAN |
| 02 | SPANISH |
| ·· | INVALID |
| FF | INVALID |

FIG. 4

SPANISH LIST

| No | name_male | No | name_female | No | name_last |
|---|---|---|---|---|---|
| 1 | Abraham | 1 | Abril | 1 | Acosta |
| 2 | Adolfo | 2 | Adriana | 2 | Acuña |
| 3 | Adrián | 3 | Africa | 3 | Agüero |
| 4 | Agustín | 4 | Aida | 4 | Aguirre |
| 5 | Alberto | 5 | Aina | 5 | Álvarez |
| : | : | : | : | : | : |
| 50 | Iñigo | 50 | Eva | 50 | Maidana |
| 51 | Isaac | 51 | Gloria | 51 | Maldonado |
| 52 | Ismael | 52 | Inés | 52 | Mansilla |
| 53 | Ivan | 53 | Inma | 53 | Martin |
| 54 | Jacinto | 54 | Isabel | 54 | Martínez |
| 55 | Jacob | 55 | Lara | 55 | Medina |
| : | : | : | : | : | : |
| 100 | Valentin | 100 | Verónica | 100 | Velázquez |

AMERICAN LIST

| No | name_male | No | name_female | No | name_last |
|---|---|---|---|---|---|
| 1 | Aaron | 1 | Abbey | 1 | Adams |
| 2 | Adam | 2 | Abi | 2 | Allen |
| 3 | Alan | 3 | Adele | 3 | Anderson |
| 4 | Alex | 4 | Alexandra | 4 | Bailey |
| 5 | Andrew | 5 | Alice | 5 | Baker |
| : | : | : | : | : | : |
| 50 | Jonathan | 50 | Janet | 50 | Martin |
| 51 | Keith | 51 | Janice | 51 | Mason |
| 52 | Ken | 52 | Jenifer | 52 | Matthews |
| 53 | Kenneth | 53 | Jessica | 53 | Miller |
| 54 | Kevin | 54 | Joanna | 54 | Mills |
| 55 | Lawrence | 55 | Julia | 55 | Mitchell |
| : | : | : | : | : | : |
| 100 | Vincent | 100 | Stephanie | 100 | Wood |

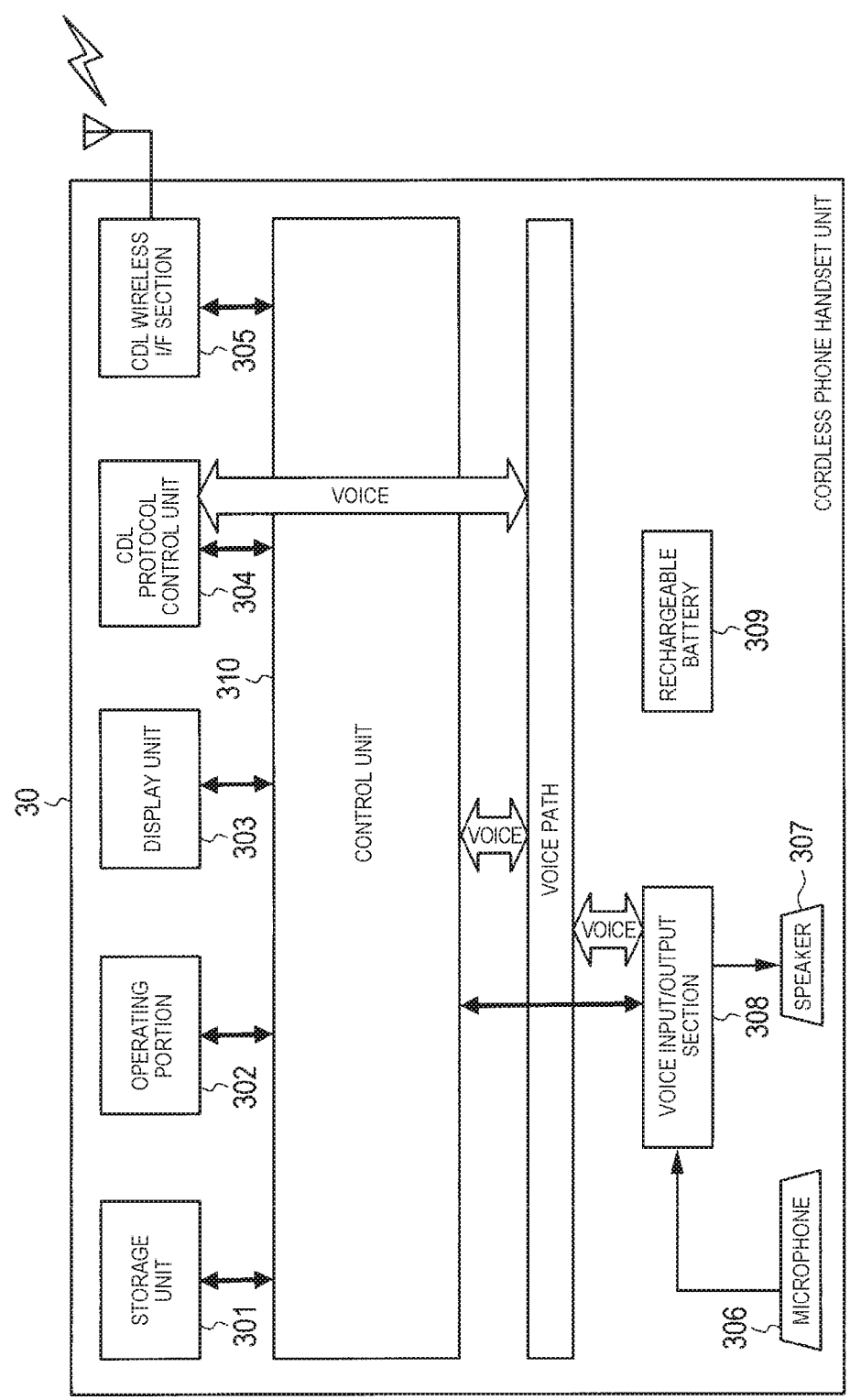

FIG. 9

| REGISTRATION 1 | PHONE NUMBER | 124-222-1234 |
|---|---|---|
| | NAME OF OTHER PARTY | Adrián Gutiérrez |
| REGISTRATION 2 | PHONE NUMBER | 521-987-5555 |
| | NAME OF OTHER PARTY | John Smith |
| REGISTRATION 3 | PHONE NUMBER | 184-555-4875 |
| | NAME OF OTHER PARTY | Jesús Arias |
| ⋮ | ⋮ | ⋮ |
| REGISTRATION 100 | PHONE NUMBER | 234-456-6789 |
| | NAME OF OTHER PARTY | Mike Brown |

FIG. 11

| CHARACTER | LANGUAGE |
|---|---|
| á、é、í、ó、ñ、ü・・・ | SPANISH |

PHONE DEVICE

BACKGROUND

1. Technical Field

The present disclosure relates to a phone device that has a function of vocally outputting the name of a caller upon call reception.

2. Description of the Related Art

In the related art, there is provided a service called number display that displays phone number information of a caller on a display unit of a phone device upon call reception. This service allows the caller to be identified before a receiver is lifted and thus is convenient. In such a service, a displayed content is required to be viewed by eyes in order to identify the caller, and a problem arises in that the caller cannot be immediately identified at a location separated from the phone device upon call reception.

Regarding this matter, a configuration that relates to a phone device presenting information as to a caller and that, in a case of obtaining phone number information of a caller upon call reception, references a preregistered relationship among a phone number, a name, and a title based on the obtained phone number information and vocally outputs the corresponding name and the title is disclosed in Japanese Patent Unexamined Publication No. 2002-218044.

However, Japanese Patent Unexamined Publication No. 2002-218044 includes one language that can be vocally output. Thus, in a case where, for example, the caller is a foreigner, the name cannot be vocally output with pronunciation specific to the country of the nationality of the foreigner, and a problem arises in that it is difficult for a user on the call reception side to recognize the caller.

SUMMARY

An object of the present disclosure is to provide a phone device that produces vocal output with pronunciation corresponding to a caller and thereby allows a user on the call reception side to accurately recognize the caller without viewing a display unit.

A phone device according to the present disclosure employs a configuration including a storage unit that stores a phone number of other party in association with a name of the other party in a registration table, a reading unit that reads the name of the other party from the storage unit based on a received phone number of the other party, a language selection unit that selects a language corresponding to the read name of the other party, and a voice data generating unit that converts the read name of the other party into voice data in the selected language and outputs the voice data.

According to the present disclosure, producing vocal output with pronunciation corresponding to a caller allows a user on the call reception side to accurately recognize the caller without viewing a display unit.

BRIEF DESCRIPTION OF THE DRAWINGS

FIGS. 3A and 3B are diagrams illustrating one example of a registration table according to the first exemplary embodiment;

FIG. 4 is a diagram illustrating a language-specific name table according to the first exemplary embodiment;

FIG. 5 is a block diagram illustrating a configuration of a cordless phone handset unit according to the first exemplary embodiment;

FIG. 9 is a diagram illustrating one example of a registration table according to a second exemplary embodiment;

FIG. 11 is a diagram illustrating one example of a registration table according to a third exemplary embodiment.

DETAILED DESCRIPTIONS

Hereinafter, one exemplary embodiment of the present disclosure will be described in detail with appropriate reference to the drawings.

First Exemplary Embodiment

Configuration of Phone System

Figure 1:
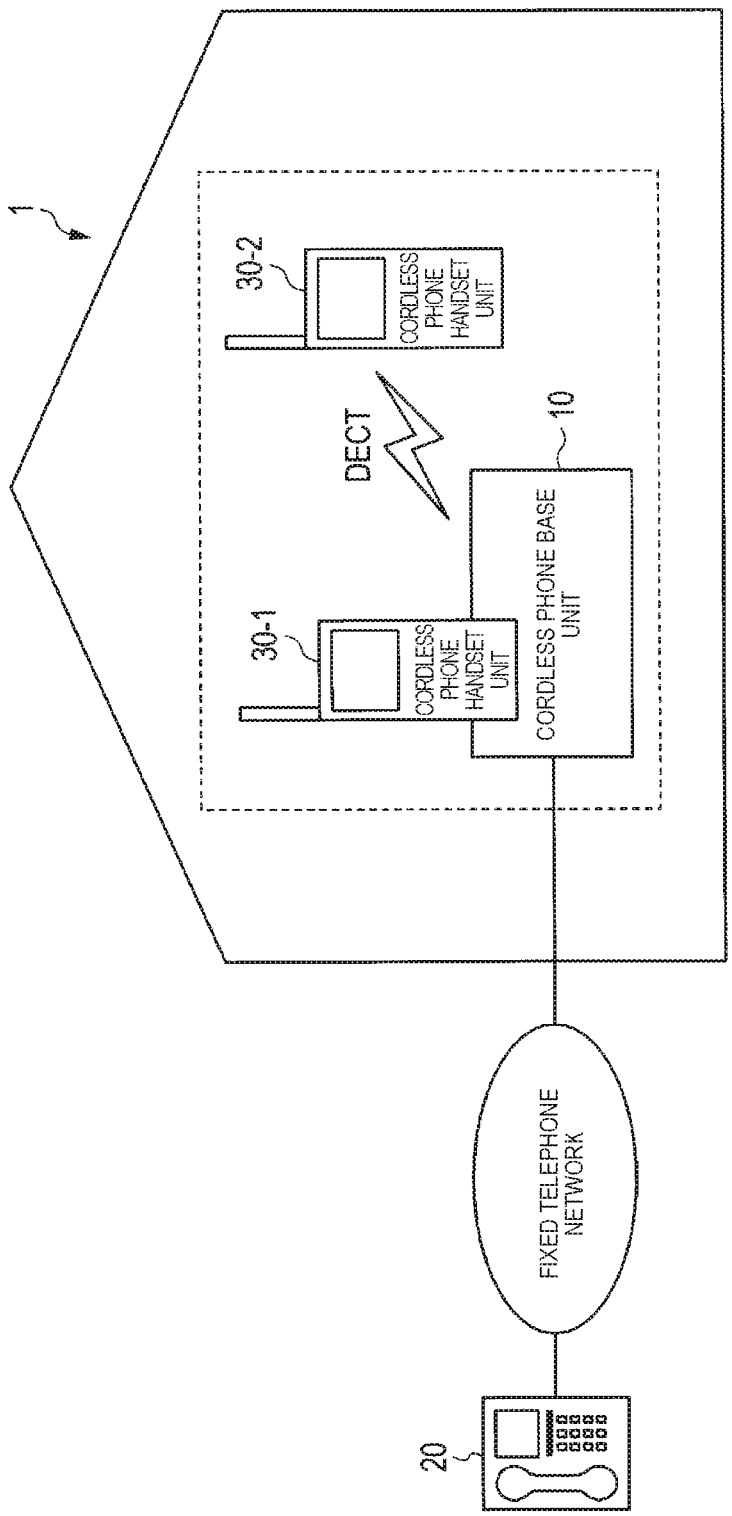
FIG. 1 is a block diagram illustrating a configuration of a phone system according to a first exemplary embodiment.

FIG. 1 is a block diagram illustrating a configuration of phone system 1 according to a first exemplary embodiment. As illustrated in FIG. 1, phone system 1 includes cordless phone base unit 10, fixed phone 20, and cordless phone handset unit 30. While phone system 1 is illustrated as including two cordless phone handset units 30-1 and 30-2 in FIG. 1, the number of cordless phone handset units 30 is not limited in the present exemplary embodiment.

Cordless phone base unit 10 can be connected to fixed phone 20 through a fixed telephone network. Cordless phone base unit 10 can be wirelessly connected to each cordless phone handset unit 30 in a house.

Fixed phone 20 is disposed outside of the house or in another house and can be connected to cordless phone base unit 10 through the fixed telephone network.

Each cordless phone handset unit 30 can be wirelessly connected to cordless phone base unit 10 and can be connected to fixed phone 20 through cordless phone base unit 10 and the fixed telephone network. Each cordless phone handset unit 30 typically communicates with cordless phone base unit 10 by using the digital enhanced cordless telecommunications (DECT) scheme which is a wireless communication scheme.

Configuration of Cordless Phone Base Unit

Figure 2:
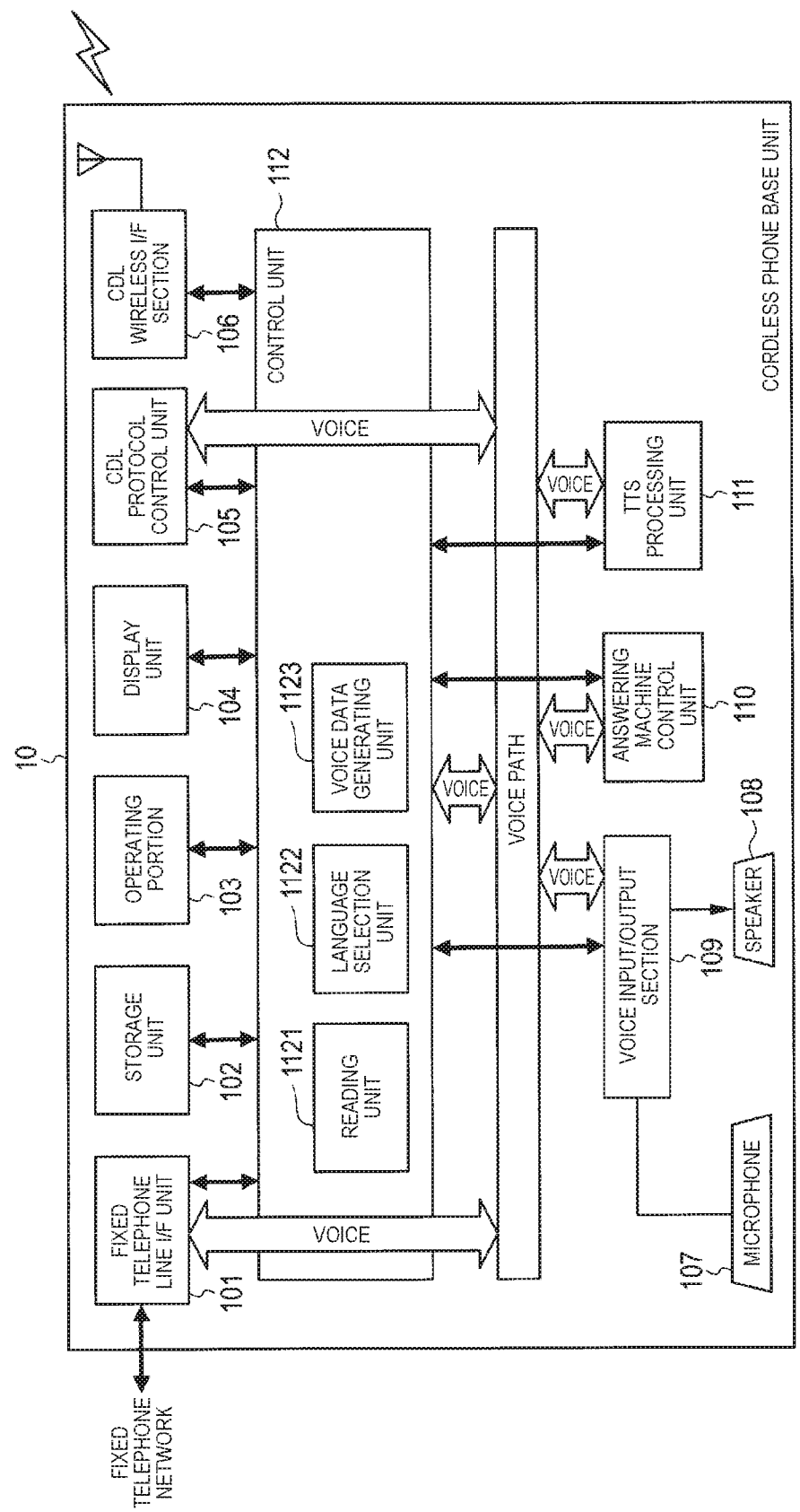
FIG. 2 is a block diagram illustrating a configuration of a cordless phone base unit according to the first exemplary embodiment.

Next, a configuration of cordless phone base unit 10 according to the present exemplary embodiment will be described in detail below with reference to FIG. 2.

Cordless phone base unit 10 that is a phone device includes fixed telephone line I/F unit 101, storage unit 102, operating portion 103, display unit 104, CDL protocol control unit 105, CDL wireless I/F section 106, microphone 107, speaker 108, voice input/output section 109, answering machine control unit 110, text-to-speech (TTS) processing unit 111, and control unit 112.

Fixed telephone line I/F unit 101 is connected to the fixed telephone network upon calling or receiving a call and receives phone number information of a caller from the fixed telephone network upon call reception and outputs the phone number information to control unit 112.

Storage unit 102 stores information such as various types of setting data, phone book data, calling and call reception history information, and an SMS message. Particularly, storage unit 102 in the present exemplary embodiment stores a first registration table in which the phone number of the other party, the name of the other party, and management information are associated with each other as illustrated in FIG. 3A, and stores a second registration table in which the management information and a language are associated with each other as illustrated in FIG. 3B. Furthermore, storage unit 102 may store a language-specific name table in which a plurality of names is registered for each language as illustrated in FIG. 4.

Operating portion 103 is configured of a dial and various functional buttons operated by a user. Operating portion 103 outputs an electrical signal corresponding to an operation by a user to control unit 112.

Display unit 104 displays various types of information in accordance with control of control unit 112. Here, a liquid crystal display (LCD) is illustrated as display unit 104.

CDL protocol control unit 105 performs control in accordance with a predetermined protocol that is required for sending and receiving voice data with each cordless phone handset unit 30.

CDL wireless I/F section 106 processes a sent signal input from control unit 112 for wireless use by, for example, converting the frequency thereof and thereby generates a wireless signal and wirelessly sends the generated wireless signal to each cordless phone handset unit 30. In addition, CDL wireless I/F section 106 processes a wireless signal received wirelessly from each cordless phone handset unit 30 for wireless use by, for example, converting the frequency thereof and thereby generates a received signal and outputs the generated received signal to control unit 112.

Microphone 107 collects ambient voice and the like. Speaker 108 outputs the voice of voice data from voice input/output section 109.

Voice input/output section 109 converts the voice collected by microphone 107 into voice data and outputs the voice data to control unit 112. Voice input/output section 109 causes voice data input from control unit 112 to be output from speaker 108 as a voice.

Answering machine control unit 110 stores an answering machine message and records and reproduces a message in accordance with control of control unit 112.

TTS processing unit 111, based on name information input from reading unit 1121 of control unit 112 and language information input from language selection unit 1122 of control unit 112, generates TTS language data for the language of the language information. TTS processing unit 111 outputs the generated TTS language data to control unit 112 (voice data generating unit 1123). Here, the TTS language data is uttered voice data that is created in TTS format.

Control unit 112 controls above each unit in response to an electrical signal input from operating portion 103. In addition, control unit 112 processes the received signal input from CDL wireless I/F section 106 for use in a predetermined protocol in accordance with control of CDL protocol control unit 105 and thereby obtains voice data and outputs the obtained voice data to voice input/output section 109. In addition, control unit 112 processes output voice data obtained from the voice input/output section 109 for use in a predetermined protocol in accordance with control of CDL protocol control unit 105 and thereby generates a sent signal and outputs the generated sent signal to CDL wireless I/F section 106.

Control unit 112 includes reading unit 1121, language selection unit 1122, and voice data generating unit 1123 as functions according to the present disclosure.

Reading unit 1121 references the first registration table of storage unit 102 and reads the name of the other party and the management information corresponding to the phone number information of the caller input from fixed telephone line I/F unit 101. Reading unit 1121, in a case where, for example, the phone number information of the other party is 124-222-1234, references the first registration table of FIG. 3A and reads the name Adrian Gutierrez of the other party and management information 02 of registration 1 associated with the phone number information 124-222-1234. Reading unit 1121 outputs the name information of the read name to TTS processing unit 111 and outputs the management information to language selection unit 1122.

Language selection unit 1122 references the second registration table of storage unit 102 and selects a language corresponding to the management information input from reading unit 1121. For example, in a case where the management information is 02, language selection unit 1122 of control unit 112 references the second registration table of FIG. 3B and selects Spanish associated with the management information 02. Language selection unit 1122 outputs the language information of the selected language to TTS processing unit 111.

Voice data generating unit 1123 converts the TTS language data input from TTS processing unit 111 into voice data for vocal output with pronunciation of the language selected by language selection unit 1122. The voice data output from voice data generating unit 1123 is output as a voice from speaker 108 through voice input/output section 109. In addition, the voice data output from voice data generating unit 1123 is sent to cordless phone handset unit 30 through CDL wireless I/F section 106 and is output as a voice from speaker 307 (refer to FIG. 5) of cordless phone handset unit 30.

Configuration of Cordless Phone Handset Unit

A configuration of cordless phone handset unit 30 according to the first exemplary embodiment will be described in detail below with reference to FIG. 5.

Cordless phone handset unit 30 includes storage unit 301, operating portion 302, display unit 303, CDL protocol control unit 304, CDL wireless I/F section 305, microphone 306, speaker 307, voice input/output section 308, rechargeable battery 309, and control unit 310.

Storage unit 301 stores information such as various types of setting data and a calling history.

Operating portion 302 is configured of a dial and various functional buttons operated by a user. Operating portion 302 outputs an electrical signal corresponding to an operation by a user to control unit 310.

Display unit 303 displays various types of information in accordance with control of control unit 310. Here, an LCD is illustrated as display unit 303. Operating portion 302 and display unit 303 may be configured of a touch panel.

CDL protocol control unit 304 performs control in accordance with a predetermined protocol that is required for sending and receiving voice data with cordless phone base unit 10.

CDL wireless I/F section 305 processes a wireless signal received from cordless phone base unit 10 for wireless use by, for example, converting the frequency thereof and thereby generates a received signal and outputs the generated received signal to control unit 310. In addition, CDL wireless I/F section 305 processes a sent signal input from control unit 310 for wireless use by, for example, converting the frequency thereof and thereby generates a wireless signal and wirelessly sends the generated wireless signal to cordless phone base unit 10.

Microphone 306 collects ambient voice and the like. Speaker 307 outputs the voice of voice data from voice input/output section 308.

Voice input/output section 308 converts the voice collected by microphone 306 into voice data and outputs the voice data to control unit 310. Voice input/output section 308 causes voice data input from control unit 310 to be output from speaker 307 as a voice.

Rechargeable battery 309 is a repeatedly rechargeable secondary battery and is a power source of cordless phone handset unit 30.

Control unit 310 controls above each unit in response to an electrical signal input from operating portion 302. Control unit 310 processes voice data input from voice input/output section 308 for use in a predetermined protocol in accordance with control of CDL protocol control unit 304 and thereby generates a sent signal and outputs the generated sent signal to CDL wireless I/F section 305. In addition, control unit 310 processes the received signal input from CDL wireless I/F section 305 for use in a predetermined protocol in accordance with control of CDL protocol control unit 304 and thereby obtains voice data and outputs the obtained voice data to voice input/output section 308.

Operation of Cordless Phone Base Unit

Figure 6:
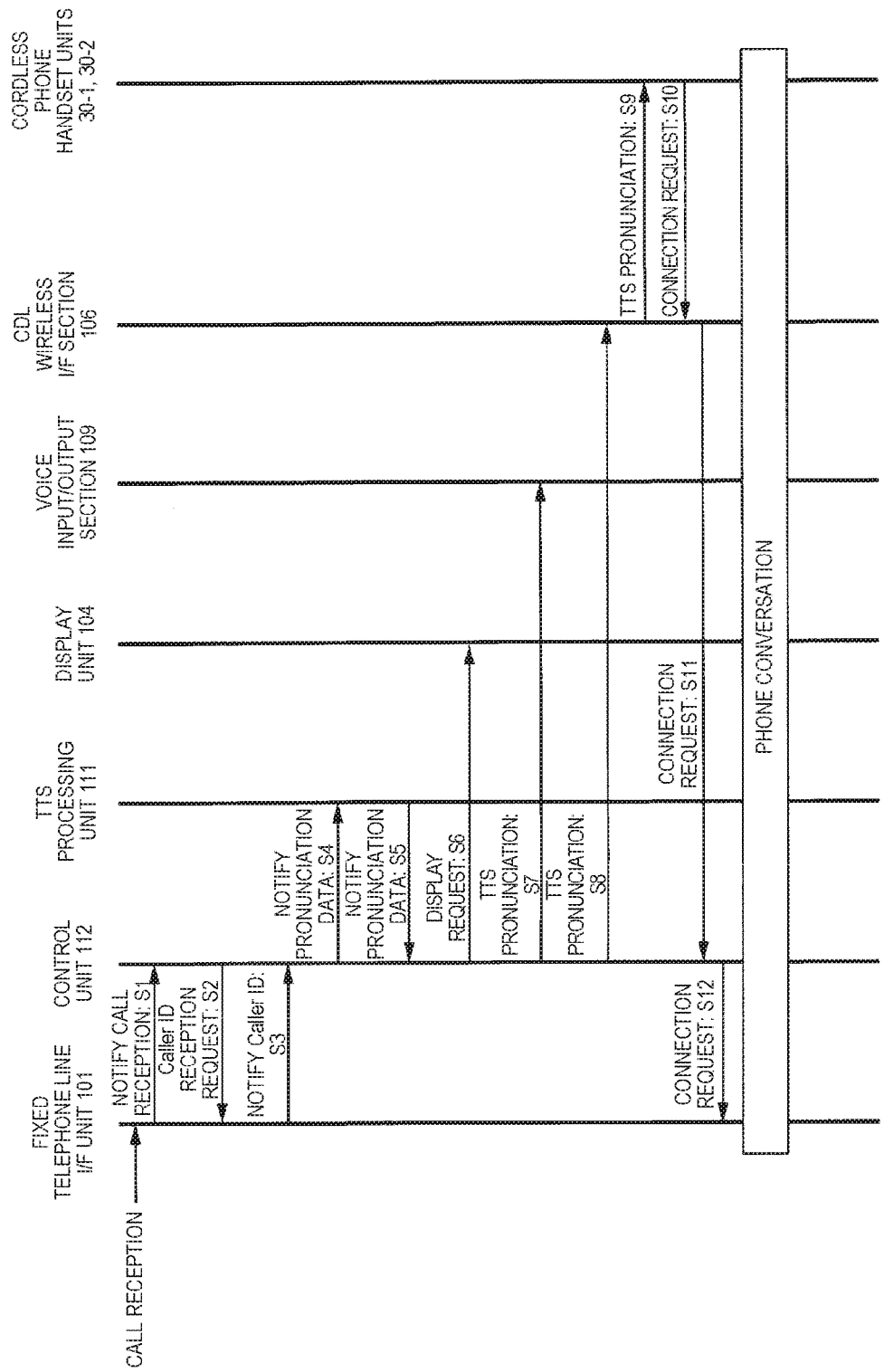
FIG. 6 is a sequence diagram illustrating operation of the cordless phone base unit according to the first exemplary embodiment.

Operation of cordless phone base unit 10 according to the first exemplary embodiment will be described in detail below with reference to FIG. 6.

First, fixed telephone line I/F unit 101, in a case where there is reception of a call from a caller, outputs, to control unit 112, a call reception notification message that notifies call reception (S1).

Next, control unit 112 outputs, to fixed telephone line I/F unit 101, a Caller ID reception request message that requests notification of the phone number information of the other party (S2).

Next, fixed telephone line I/F unit 101 outputs, to control unit 112, a Caller ID notification message that includes the phone number information of the other party (S3).

Next, control unit 112 references the registration tables of storage unit 102, reads the name of the other party corresponding to the phone number information of the other party, and selects a language.

Control unit 112 outputs, to TTS processing unit 111, a pronunciation data notification message that includes information as to the name of the other party read by reading unit 1121 and information as to the language selected by language selection unit 1122 (S4).

Next, TTS processing unit 111 converts the name of the other party into TTS language data of the language selected by language selection unit 1122 of control unit 112 and outputs, to control unit 112, a pronunciation data notification message that includes the converted TTS language data (S5).

Next, control unit 112 outputs, to display unit 104, a display request message that includes information as to the phone number and the address of the other party (S6).

Next, voice data generating unit 1123 of control unit 112 converts the TTS language data into voice data for voice output with pronunciation of the language selected by language selection unit 1122 and outputs the converted voice data to voice input/output section 109 (S7). Accordingly, voice input/output section 109 causes the name of the other party to be vocally output in the language selected by control unit 112 from speaker 108.

Next, control unit 112 outputs, to CDL wireless I/F section 106, a sent signal that includes the voice data in which the name of the other party read by reading unit 1121 is converted into the language selected by language selection unit 1122 (S8).

Next, CDL wireless I/F section 106 calls and rings cordless phone handset unit 30 and wirelessly sends, to cordless phone handset unit 30, a TTS pronunciation message that is a wireless signal and includes the voice data (S9). Accordingly, cordless phone handset unit 30 vocally outputs the name of the caller with pronunciation based on the voice data.

Next, a user who hears the vocally output name of the caller operates cordless phone handset unit 30, and thereby cordless phone handset unit 30 is placed into a state where a phone conversation is available with cordless phone base unit 10, and wirelessly sends a connection request message to CDL wireless I/F section 106 (S10).

Next, CDL wireless I/F section 106 outputs the received connection request message to control unit 112 (S11).

Next, control unit 112 transfers the connection request message to fixed phone 20 through fixed telephone line I/F unit 101 (S12). Accordingly, a phone conversation is initiated between fixed phone 20 and cordless phone handset unit 30.

Registration Table Setting Process

Figure 7:
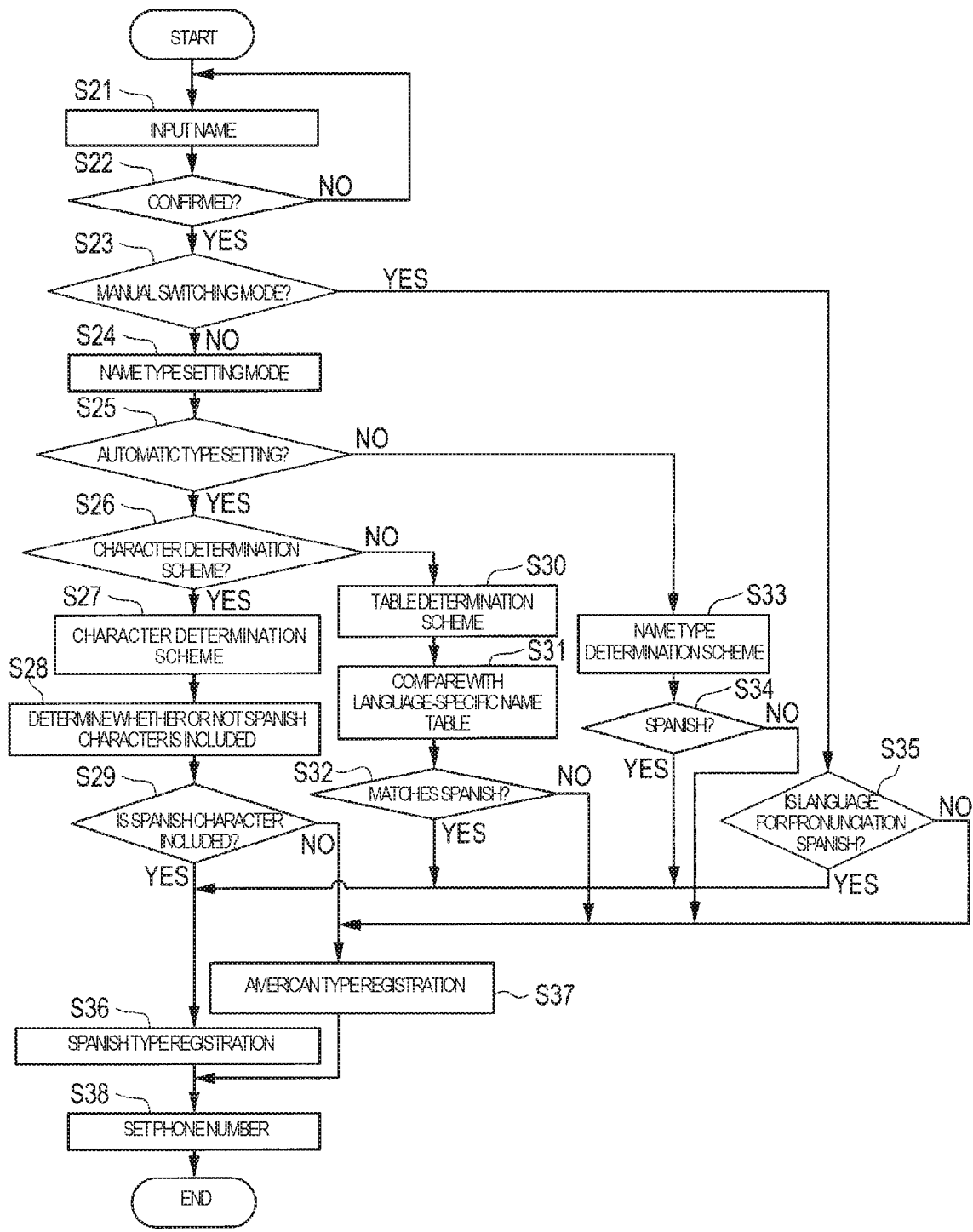
FIG. 7 is a flowchart illustrating a registration table setting process according to the first exemplary embodiment.

A registration table setting process according to the first exemplary embodiment will be described in detail below with reference to FIG. 7.

The registration table setting process is initiated when a predetermined operation is performed for operating portion 103 of cordless phone base unit 10.

First, a name is input into cordless phone base unit 10 by using operating portion 103 (S21).

Next, control unit 112 determines whether or not the input name is confirmed by an operation performed for operating portion 103 (S22).

Control unit 112, in a case where the input name is confirmed (YES in S22), determines whether or not a manual switching mode in which the language for pronunciation is manually switched is selected by an operation performed for operating portion 103 (S23). Control unit 112 returns the flow to S21 in a case where the input name is not confirmed (NO in S22).

Control unit 112 transitions into a name type setting mode (S24) in a case where the manual switching mode is not selected (NO in S23).

Next, control unit 112 determines whether or not automatic type setting is selected by an operation performed for operating portion 103 (S25).

Control unit 112, in a case where automatic type setting is selected (YES in S25), determines whether or not a character determination scheme is selected by using operating portion 103 (S26).

Control unit 112, in a case where a character determination scheme is selected (YES in S26), determines that the registration tables are set by using the character determination scheme (S27).

Next, control unit 112 performs a determination process that determines whether or not the input name includes a character specific to Spanish (S28).

Next, control unit 112 determines whether or not a character specific to Spanish is included, as a result of the determination process (S29).

The flow proceeds to S36 in a case where a character specific to Spanish is included (YES in S29). Meanwhile, the flow proceeds to S37 in a case where a character specific to Spanish is not included (NO in S29).

Control unit 112, in a case where a character determination scheme is not selected in S26 (NO in S26), determines that the registration tables are set by using a table determination scheme (S30).

Next, control unit 112 performs a comparison process that compares the input name with a language-specific name table (refer to FIG. 4) (S31).

Control unit 112 determines whether or not the input name is included in a Spanish table of the language-specific name table (S32).

The flow proceeds to S36 in a case where the input name is included in the Spanish table (YES in S32). Meanwhile, the flow proceeds to S37 in a case where the input name is not included in the Spanish table (NO in S32).

Control unit 112, in a case where automatic type setting is not selected in S25 (NO in S25), determines that the registration tables are set by using a name classification scheme (S33).

Next, control unit 112 determines whether or not Spanish is selected as a language corresponding to the input name by an operation performed for operating portion 103 (S34).

The flow proceeds to S36 in a case where Spanish is selected (YES in S34). Meanwhile, the flow proceeds to S37 in a case where Spanish is not selected (NO in S34).

Control unit 112, in a case where the manual switching mode is selected in S23 (YES in S23), determines whether or not Spanish is selected as a language for pronunciation by an operation performed by the user for operating portion 103 (S35).

The flow proceeds to S36 in a case where Spanish is selected as a language for pronunciation (YES in S35). Meanwhile, the flow proceeds to S37 in a case where Spanish is not selected as a language for pronunciation (NO in S35).

Control unit 112 in S36 performs a Spanish type registration process that sets the management information 02. Meanwhile, control unit 112 in S37 performs an American type registration process that sets management information 01.

Control unit 112 after S36 or S37 sets, in the first registration table in association with the name and the management information, a phone number that is set by an operation performed for operating portion 103 (S38).

The registration table setting process is performed each time a name is input.

Vocal Guidance Process

Figure 8:
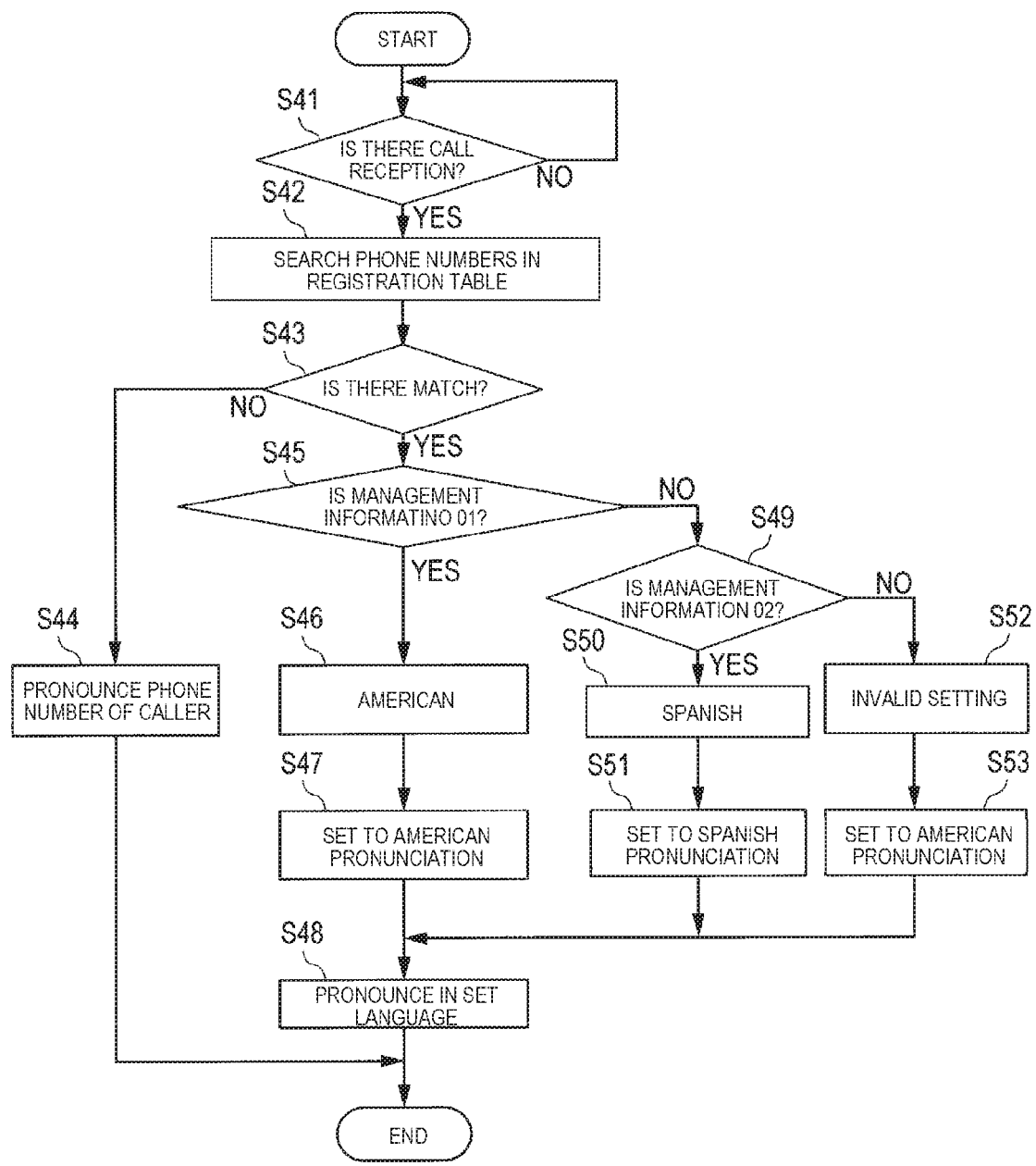
FIG. 8 is a flowchart illustrating a vocal guidance process according to the first exemplary embodiment.

A vocal guidance process according to the first exemplary embodiment will be described in detail below with reference to FIG. 8.

First, control unit 112 determines whether or not there is call reception (S41). Control unit 112, in a case where there is call reception (YES in S41), obtains the phone number information of the other party and searches phone numbers in the registration tables stored in storage unit 102 (S42). The flow returns to S41 in a case where there is no call reception (NO in S41).

Next, control unit 112 determines whether or not a phone number that matches the phone number of the phone number information of the other party exists in the registration tables (S43).

Control unit 112, in a case where a matching phone number does not exist in the registration tables (NO in S43), vocally outputs the phone number of the caller (the other party) (S44).

Meanwhile, control unit 112, in a case where a matching phone number exists in the registration tables (YES in S43), determines whether or not management information associated with the matching phone number in the registration tables is 01 (S45).

Control unit 112, in a case where the management information is 01 (YES in S45), determines the language of the name to be American (S46) and sets American as a language for pronunciation of the name (S47). Then, cordless phone base unit 10 vocally outputs the name in the set language (S48).

Meanwhile, control unit 112, in a case where the management information is not 01 (NO in S45), determines whether or not the management information is 02 (S49).

Control unit 112, in a case where the management information is 02 (YES in S49), determines the language of the name to be Spanish (S50) and sets Spanish as a language for pronunciation of the name (S51). Then, cordless phone base unit 10 vocally outputs the name in the set language (S48).

Meanwhile, control unit 112, in a case where the management information is not 02 (NO in S49), determines the name to be invalid (S52) and sets American as a language for pronunciation of the name (S53). Then, cordless phone base unit 10 vocally outputs the name in the set language (S48).

As described heretofore, the present exemplary embodiment includes reading unit 1121 that reads the name of the other party based on the received phone number of the other party, language selection unit 1122 that selects a language corresponding to the read name of the other party, and voice data generating unit 1123 that converts the read name of the other party into voice data in the selected language and outputs the voice data. Accordingly, since vocal output can be produced with pronunciation corresponding to a caller, a user on the call reception side can accurately recognize the caller without viewing a display unit.

Second Exemplary Embodiment

Next, a second exemplary embodiment will be described. A configuration of a phone system (FIG. 1), a configuration of a cordless phone base unit (FIG. 2), a configuration of a cordless phone handset unit (FIG. 5), and operation of the cordless phone base unit (FIG. 6) of the second exemplary embodiment are the same as those of the first exemplary embodiment.

Storage unit 102 in the present exemplary embodiment stores a third registration table in which the phone number of the other party and the number of the other party are associated with each other as illustrated in FIG. 9, instead of the first registration table illustrated in FIG. 3A and the second registration table illustrated in FIG. 3B. In addition, storage unit 102 stores the language-specific name table illustrated in FIG. 4.

Reading unit 1121 references the third registration table, reads the name and the management information of the other party corresponding to the phone number information of the caller input from fixed telephone line I/F unit 101, and outputs the name information of the read name to TTS processing unit 111 and the management information to language selection unit 1122.

Language selection unit 1122 references the language-specific name table and selects a language in which the name information input from reading unit 1121 is included.

Vocal Guidance Process

Figure 10:
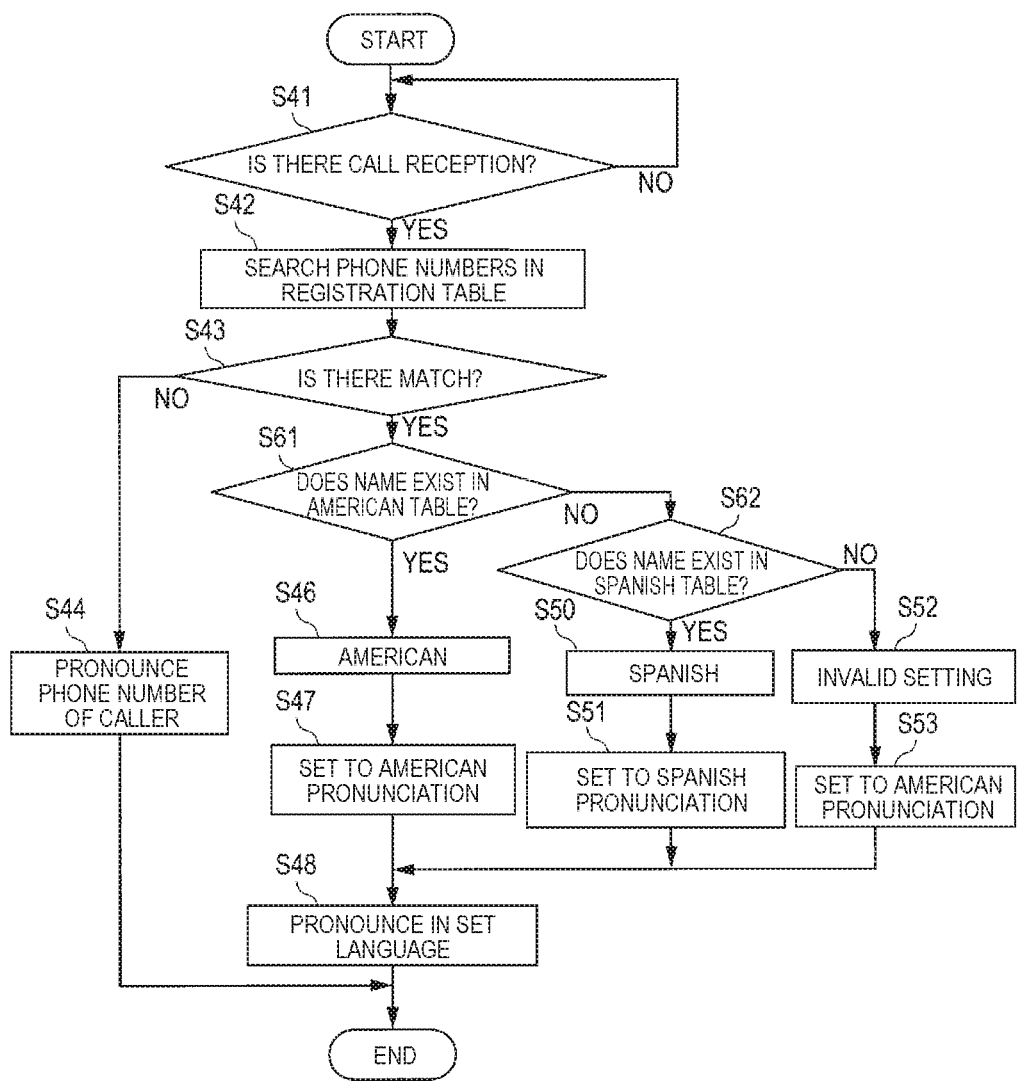
FIG. 10 is a flowchart illustrating a vocal guidance process according to the second exemplary embodiment.

Hereinafter, a vocal guidance process according to the present exemplary embodiment will be described in detail below with reference to FIG. 10. The same parts of operation as in FIG. 8 will be designated by the same reference signs in FIG. 10 and will not be described. The flow of FIG. 10 performs S61 instead of S45 and performs S62 instead of S49 compared with the flow of FIG. 8.

Control unit 112, in a case where a matching phone number exists in the registration table illustrated in FIG. 9 in the process of S43 (YES in S43), determines whether or not a name associated with the matching phone number in the registration table of FIG. 9 exists in an American table illustrated in FIG. 4 (S61).

Control unit 112, in a case where the name exists in the American table illustrated in FIG. 4 (YES in S61), determines the language of the name to be American (S46) and sets American as a language for pronunciation of the name (S47).

Meanwhile, control unit 112, in a case where the name does not exist in the American table illustrated in FIG. 4 (NO in S61), determines whether or not the name exists in the Spanish table illustrated in FIG. 4 (S62).

Control unit 112, in a case where the name exists in the Spanish table illustrated in FIG. 4 (YES in S62), determines the language of the name to be Spanish (S50) and sets Spanish as a language for pronunciation of the name (S51). Then, cordless phone base unit 10 vocally outputs the name in the set language (S48).

Meanwhile, control unit 112, in a case where the name does not exist in the Spanish table illustrated in FIG. 4 (NO in S62), determines the name to be invalid (S52) and sets American as a language for pronunciation of the name (S53). Then, cordless phone base unit 10 vocally outputs the name in the set language (S48).

As described heretofore, the present exemplary embodiment can produce vocal output with pronunciation corresponding to a caller in the same manner as the first exemplary embodiment, and thus a user on the call reception side can accurately recognize the caller without viewing a display unit.

Third Exemplary Embodiment

Next, a third exemplary embodiment will be described. A configuration of a phone system (FIG. 1), a configuration of a cordless phone base unit (FIG. 2), a configuration of a cordless phone handset unit (FIG. 5), and operation of the cordless phone base unit (FIG. 6) of the third exemplary embodiment are the same as those of the first exemplary embodiment.

Figure 11:
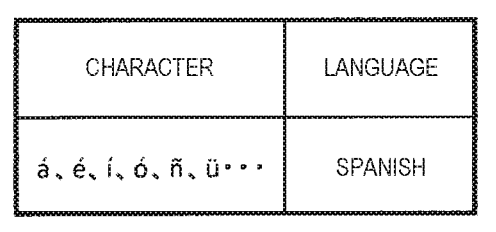

Storage unit 102 in the present exemplary embodiment stores the third registration table illustrated in FIG. 9 and a language-specific character table in which a character specific to each language and the language are associated with each other as illustrated in FIG. 11, instead of the first registration table illustrated in FIG. 3A and the second registration table illustrated in FIG. 3B.

Reading unit 1121 references the third registration table, reads the name and the management information of the other party corresponding to the phone number information of the caller input from fixed telephone line I/F unit 101, and outputs the name information of the read name to TTS processing unit 111 and the management information to language selection unit 1122.

Language selection unit 1122 references the language-specific character table and selects a language according to whether or not a specific character of the language-specific character table is included in the name information input from reading unit 1121.

Vocal Guidance Process

Figure 12:
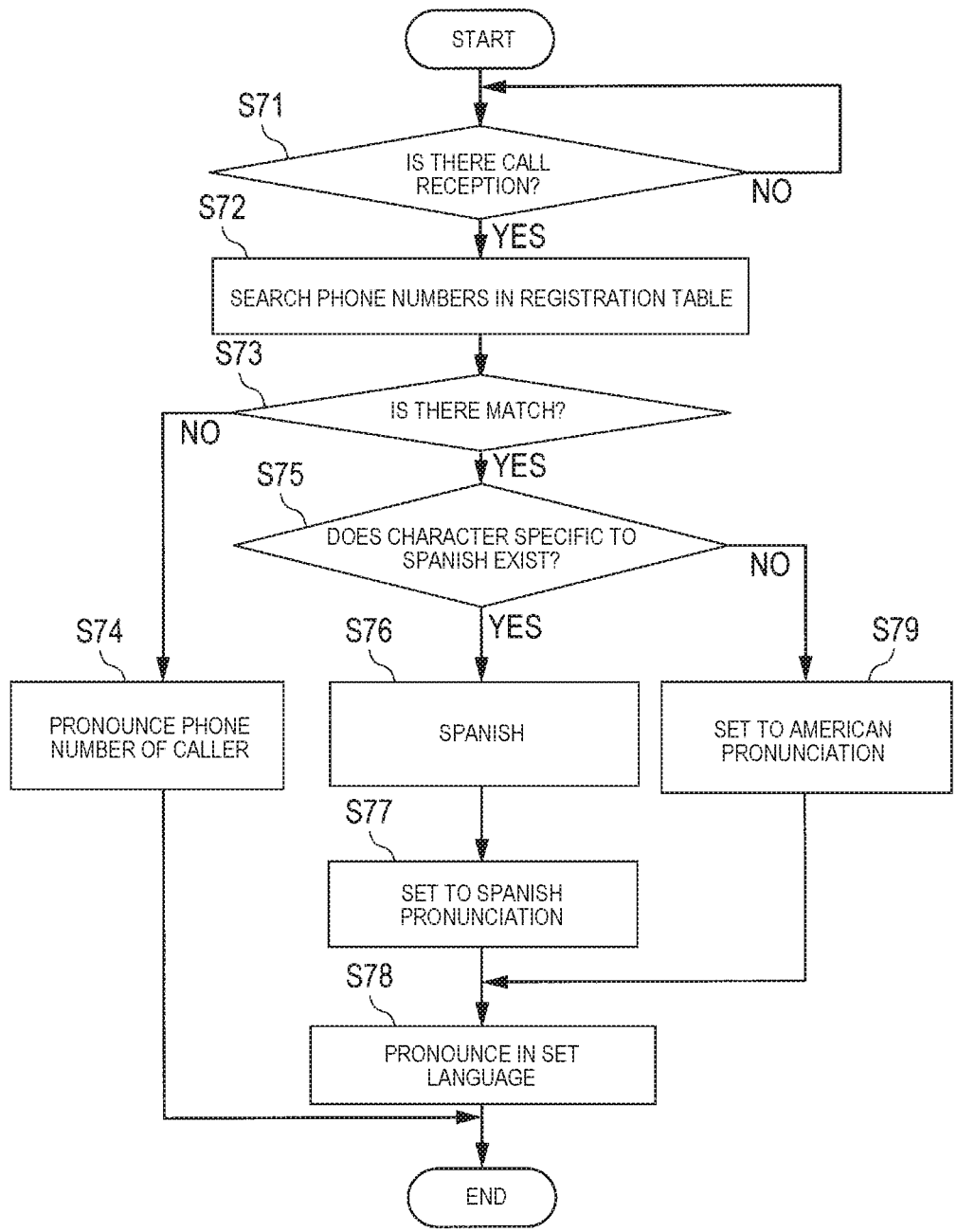
FIG. 12 is a flowchart illustrating a vocal guidance process according to the third exemplary embodiment.

Hereinafter, a vocal guidance process according to the present exemplary embodiment will be described in detail below with reference to FIG. 12.

First, control unit 112 determines whether or not there is call reception (S71).

Control unit 112 repeats the process of S71 in a case where there is no call reception (NO in S71).

Meanwhile, control unit 112, in a case where there is call reception (YES in S71), obtains the phone number information of the other party and searches phone numbers in the registration table stored in storage unit 102 (S72).

Next, control unit 112 determines whether or not a phone number that matches the phone number of the phone number information of the other party exists in the third registration tables (S73).

Control unit 112, in a case where a matching phone number does not exist in the third registration tables (NO in S73), vocally outputs the phone number of the caller (the other party) (S74).

Meanwhile, control unit 112, in a case where a matching phone number exists in the third registration table (YES in S73), reads a name associated with the matching phone number in the third registration table and determines whether or not a specific character of the language-specific character table is included in the read name (S75).

Control unit 112, in a case where a specific character of the language-specific character table is included (YES in S75), determines the language of the name to be Spanish (S76) and sets Spanish as a language for pronunciation of the name (S77).

Next, cordless phone base unit 10 vocally outputs the name in the set language (S78).

Meanwhile, control unit 112, in a case where a specific character of the language-specific character table is not included (NO in S75), sets American as a language for pronunciation of the name (S79). Then, cordless phone base unit 10 vocally outputs the name in the set language (S78).

As described heretofore, the present exemplary embodiment can produce vocal output with pronunciation corresponding to a caller in the same manner as the first exemplary embodiment, and thus a user on the call reception side can accurately recognize the caller without viewing a display unit.

The present disclosure is not limited to the above exemplary embodiments in terms of types, arrangements, numbers, and the like of members and can be appropriately modified to the extent not departing from the gist of the disclosure such that a constituent element thereof is replaced by another that achieves the same effect.

Specifically, while a language for pronunciation is selected from two languages of American and Spanish in the first exemplary embodiment to the third exemplary embodiment, a language for pronunciation may be selected from two languages other than American and Spanish or may be selected from three or more languages.

What is claimed is:
1. A phone device comprising:
  a storage configured to store a registration table, in which phone numbers are associated with names of parties that own the phone numbers, and a language-specific name table, in which a plurality of names are registered for each of multiple languages; and one or more processors coupled to the storage and configured to:
in response to receiving a phone number, read a name of a party associated with the received phone number from the storage;
select a language for which the name of the party is registered in the language-specific name table;
select a default language when the name is not registered in the language-specific name table; and
convert the name of the party into voice data in the selected language and output the voice data.

2. The phone device of claim 1,
wherein the storage stores a language-specific character table in which at least one of the multiple languages is associated with one or more characters specific to the corresponding language, and
the one or more processors, when a character specific to a language is included in the name of the party, select the language that includes the specific character.

3. The phone device of claim 1, wherein the default language is English.

4. The phone device of claim 1, wherein the default language is Spanish.

5. The phone device of claim 1, wherein the multiple languages include English.

6. The phone device of claim 1, wherein the multiple languages include Spanish.

7. The phone device of claim 1, wherein the voice data includes the name of the party pronounced in the selected language.

8. A phone device comprising:
a storage configured to store a registration table, in which phone numbers are associated with names of parties who own the phone numbers and each of the names is associated with a first language, with a second language, or with no valid language; and
one or more processors coupled to the storage and configured to:
in response to receiving a phone number, read a name of a party associated with the received phone number from the storage;
responsive to the name associated with the first language, convert the name into voice data in the first language and output the voice data;
responsive to the name associated with the second language, convert the name into voice data in the second language and output the voice data;
responsive to the name associated with no valid language, convert the name into voice data in a default language and output the voice data, wherein the default language is one of the first language or the second language.

9. The phone device of claim 8, wherein the voice data includes the name of the party pronounced in the corresponding language.

10. The phone device of claim 8,
wherein the storage stores a first registration table in which the phone number and the name of a party are associated with language management information, and a second registration table in which three pieces of the language management information are associated with the first language, with the second language, and with no valid language, respectively, and
the one or more processors, in operation, looks up the first registration table and the second registration table to determine a language associated with the name.

11. The phone device of claim 8, wherein the default language is English.

12. The phone device of claim 8, wherein the default language is Spanish.

13. The phone device of claim 8, wherein the first language is English and the second language is Spanish.

14. The phone device of claim 8,
wherein the storage stores a language-specific character table in which at least one of the first language and the second language is associated with one or more characters specific to the corresponding language, and
the one or more processors, when a character specific to a language is included in the name, determine the language that includes the specific character as the language associated with the name.

* * * * *